(12) United States Patent
Marquardt et al.

(10) Patent No.: US 10,634,616 B1
(45) Date of Patent: Apr. 28, 2020

(54) ALIGNMENT MECHANISM FOR AN OPTICAL IMMERSION PROBE ASSEMBLY

(71) Applicant: MarqMetrix, Inc., Seattle, WA (US)

(72) Inventors: Brian James Marquardt, Seattle, WA (US); Giora Proskurowski, Seattle, WA (US); Alex McNeill, Scottsdale, AZ (US)

(73) Assignee: MarqMetrix, Inc., Seattle, WA (US)

( * ) Notice: Subject to any disclaimer, the term of this patent is extended or adjusted under 35 U.S.C. 154(b) by 0 days.

(21) Appl. No.: 16/232,188

(22) Filed: Dec. 26, 2018

(51) Int. Cl.
  *G01N 21/00* (2006.01)
  *G01N 21/85* (2006.01)
  *G02B 6/36* (2006.01)

(52) U.S. Cl.
  CPC ....... *G01N 21/8507* (2013.01); *G02B 6/3624* (2013.01)

(58) Field of Classification Search
  CPC .............. G01N 21/8507; G01N 21/31; G01N 21/0303; G01N 21/59; G01N 21/05
  USPC ......................................................... 356/436
  See application file for complete search history.

(56) References Cited

U.S. PATENT DOCUMENTS

| | | | |
|---|---|---|---|
| 6,831,745 B2 | 12/2004 | Marquardt et al. | |
| 6,977,729 B2 | 12/2005 | Marquardt et al. | |
| 2002/0126289 A1* | 9/2002 | Marquardt | G01N 21/8507 356/436 |
| 2003/0098045 A1* | 5/2003 | Loder | B08B 1/00 134/8 |
| 2017/0143214 A1* | 5/2017 | Garibotto | A61B 5/6852 |

\* cited by examiner

*Primary Examiner* — Md M Rahman
(74) *Attorney, Agent, or Firm* — Lee & Hayes, P.C.

(57) ABSTRACT

An optical immersion probe assembly with an alignment mechanism is described. The alignment mechanism ensures that proper alignment is achieved between an optical fiber head and an optical immersion probe whenever the optical immersion probe is coupled to the optical fiber head. The alignment mechanism may include a notch defined in a portion of a first annular end surface of the optical fiber head, and a projection on a periphery of the optical immersion probe. The projection on the probe may be positioned a distance from a second annular end surface of the optical immersion probe, and sized to be received within the notch of the optical fiber head. Also described herein are techniques and processes for manufacturing the components of an optical immersion probe assembly, and for assembling the optical immersion probe assembly.

18 Claims, 10 Drawing Sheets

(SECTIONS A-A & B-B)

FIG. 6 (SECTION A-A)

(SECTIONS A-A & B-B)

ALIGNMENT MECHANISM FOR AN OPTICAL IMMERSION PROBE ASSEMBLY

BACKGROUND

Spectroscopic probes are used to optically interrogate a sample for purposes of taking spectroscopic measurements of the sample. These types of probes are often referred to as "optical immersion probes." A fiber-coupled optical immersion probe can be attached to an optical fiber head, which, in turn, is attached to an optical fiber cable leading to an excitation laser source and a spectrometer. As such, light can travel from the excitation laser source to the probe, and from the probe to the spectrometer, via the optical fiber cable attached to the optical fiber head. In order to function properly, the optical fiber head and the optical immersion probe must be aligned such that a collimated beam of light does not touch the inner walls of the probe tube as it travels through the probe. With small diameter probes, great care is taken to manufacture the probes as straight as possible to achieve this alignment.

However, for various reasons, optical immersion probes can be biased, angled, and/or off-center in some aspect, which is problematic for a fiber-coupled probe because these imperfections can cause alignment issues that render the device inoperable (e.g., collimated light may strike an inner wall of the probe tube as it travels through the probe). This often leads to an extra "tuning" step in the manufacturing process for a fiber-coupled optical immersion probe. In this tuning step, a manufacturer makes adjustments in order to align the optical fiber head and the probe until a beam of light can travel from the optical fiber head, through the probe, to a lens element at the end of the probe (as well as the reverse direction) without striking the inner walls of the probe. For example, depending on the coupling mechanism that is used, a manufacturer may adjust the amount of torque when tightening set screws, and/or rotate the optical immersion probe relative to the optical fiber head until the proper alignment is achieved. This alignment issue is exacerbated with longer probes and/or smaller diameter probes, making the "tuning" step even more important with probes of these dimensions. Along these lines, unsophisticated users of fiber-coupled probes must rely on a technician to make these types of adjustments if, for example, the user wants to change the type of probe that is coupled to the optical fiber head.

SUMMARY

Described herein is, among other things, an optical immersion probe assembly with an alignment mechanism to ensure that proper alignment is achieved between an optical fiber head and an optical immersion probe whenever the optical immersion probe is coupled to the optical fiber head. Also described herein are techniques and processes for manufacturing the components of an optical immersion probe assembly, and for assembling the optical immersion probe assembly.

The alignment mechanism for the optical immersion probe assembly may be a two-part mechanism. A first part of the two-part alignment mechanism may be associated with the optical fiber head, while a second part of the two-part alignment mechanism may be associated with the optical immersion probe. The first part that is associated with the optical fiber head can be a notch that is defined in a portion of a first annular end surface of the optical fiber head. The second part that is associated with the optical immersion probe may be a projection on a periphery of the optical immersion probe. The projection on the periphery of the optical immersion probe may be positioned a distance from a second annular end surface of the optical immersion probe. When the optical immersion probe is coupled to the optical fiber head, the projection of the optical immersion probe may be received within the notch of the optical fiber head to achieve a rotational alignment that was determined by a manufacturer of the optical immersion probe assembly. This alignment mechanism also inhibits rotation of the optical immersion probe relative to the optical fiber head when the optical immersion probe assembly is in an assembled state to ensure that the rotational alignment is maintained during use of the optical immersion probe assembly.

The alignment mechanism of the optical immersion probe assembly described herein allows for convenient use of a fiber-coupled optical immersion probe. For instance, an unsophisticated user can remove (decouple) the optical immersion probe from the optical fiber head, as needed, such as for transporting the assembly from one place to another in a disassembled state, and/or cleaning the component parts, and/or to interchange different types of optical immersion probes. When the user couples an optical immersion probe to the optical fiber head, the user does not have to be concerned with the alignment of the component parts because the alignment mechanism, in combination with other features of the device, ensures that proper alignment is achieved each time the assembly is put together. Removing user variability in this manner allows any user to couple the optical immersion probe to the optical fiber head, and the user can be assured that the device will not be rendered inoperable due to an alignment issue. A fiber-coupled probe with a removable optical immersion probe can provide benefits that are not realized with existing fiber-coupled probes, such as providing the ability to swap out different types of probes for different applications. For instance, a user may couple a first type of optical immersion probe to the optical fiber head to take spectroscopic measurements of a liquid sample inside a fermenter, and may subsequently swap out the first type of optical immersion probe with a second type of optical immersion probe to take spectroscopic measurements of a sample within a sample tray.

To the accomplishment of the foregoing and related ends, the disclosed subject matter, then, includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings

BRIEF DESCRIPTION OF DRAWINGS

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

DETAILED DESCRIPTION

Figure 1:
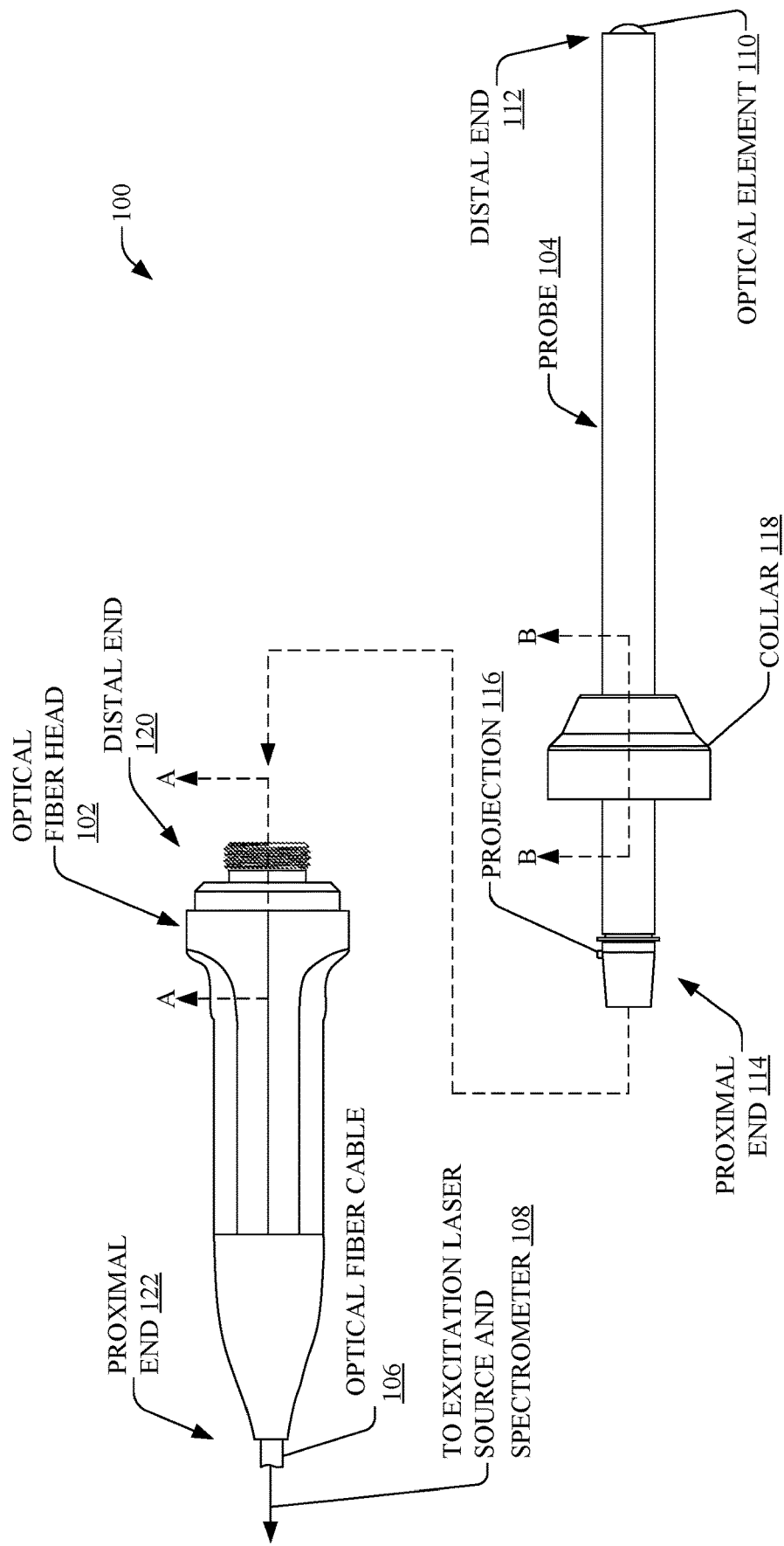
FIG. 1 illustrates a side elevation view of example components of an optical immersion probe assembly, with the components of the assembly shown in a disassembled state. The example components of the optical immersion probe assembly include an optical fiber head and an optical immersion probe, the optical immersion probe configured to be removably coupled to the optical fiber head.

FIG. 1 illustrates a side elevation view of example components of an optical immersion probe assembly 100 (sometimes shortened to "assembly 100"), with the components of the assembly 100 shown in a disassembled state. The example components of the optical immersion probe assembly 100 include an optical fiber head 102 (sometimes shortened to "fiber head 102") and an optical immersion probe 104 (sometimes shortened to "probe 104"). As shown by the dotted arrow in FIG. 1, the optical immersion probe 104 is configured to be coupled to the optical fiber head 102. The probe 104 is also configured to be decoupled from the optical fiber head 102 during normal use of the assembly 100. In this manner, the probe 104 can be removably coupled to the optical fiber head 102 by a user of the assembly 100.

When assembled and appropriately connected to auxiliary components, the optical immersion probe assembly 100 becomes an optical analytical instrument that can be used to perform optical spectroscopy of a sample (e.g., solids, liquids, gases, powders, suspensions, slurries, particles, and/or other homogeneous or heterogeneous samples) using any suitable optical spectroscopy technique. For example, the assembly 100 may be usable to perform, without limitation, Raman spectroscopy, infrared (IR) spectroscopy, ultraviolet-visible (UV-Vis) spectroscopy, near infrared (NIR) spectroscopy, Fourier-transform infrared spectroscopy (FTIR), reflectance spectroscopy, absorption spectroscopy, scattering spectroscopy, fluorescence spectroscopy, and/or other optical spectroscopy technique utilizing an excitation laser source and spectrometer. Accordingly, the optical fiber head 102 can be coupled to an excitation laser source and a spectrometer via an optical fiber cable 106, as depicted by the arrow 108 in FIG. 1, in order to facilitate performing optical spectroscopy of a sample.

During optical interrogation of a sample, the optical immersion probe 104 can be associated with a sample (e.g., inserted into the sample, brought into contact with the sample, space, or brought within, a predefined distance from the sample, etc.), and optical spectroscopy of the sample can be performed. Performance of optical spectroscopy may involve the optical fiber head 102 directing an incident beam of light (interrogating light generated by the excitation laser source) through the optical immersion probe 104 so that the beam of light is incident on a surface of an optical element 110 at a distal end 112 of the probe 104. Subsequently, the optical fiber head 102 can receive a returned beam of light via the optical element 110 and may direct the returned beam of light to the spectrometer via the optical fiber cable 106.

The optical element 110 at the distal end 112 of the probe 104 can be a spherical optical element, as shown in FIG. 1. Light exiting the optical element 110 can be focused on a sample, resulting in light being returned via the optical element 110, through the probe 104, and ultimately delivered to a spectrometer via the optical fiber head 102 and optical fiber cable 106. "Spherical optical element," or similar terms, as used herein, generally means an optical element 110, e.g., a lens, etc., that has a spherical, or nearly spherical, geometry. Various non-limiting examples of spherical optical technology for probes is found in U.S. Pat. Nos. 6,831,745 and 6,977,729, the entireties of which are hereby incorporated herein by reference.

In an aspect, assembly 100 can enable contact-type spectroscopy, wherein the optical element 110 can be put in contact with (or inserted into) a sample. In embodiments where the optical element 110 protrudes from the most distal portion of probe 104, a surface of the optical element 110 can be brought into contact with a sample that is nearly any state of matter, e.g., solids, glasses, slurries, liquids, gases, etc. An example optical immersion probe 104 that is suitable for use in such applications is the TouchRaman™ (MarqMetrix Inc., Seattle, Wash.) probe(s), which can comprise a spherical optical element, e.g., BallProbe® (MarqMetrix Inc., Seattle, Wash.). In this manner, the assembly 100 can obtain, for example, Raman spectra, by bringing the spherical optical element 110 in contact with a sample.

It is to be appreciated that other types of probes 104 can be utilized in the assembly 100. For example, the optical immersion probe 104 may include an optical element 110 that is configured to optically interrogate a sample from a distance (e.g., where the sample is a determined distance, or within a threshold distance, from optical element 110 or the distal end 112 of the probe 104). As another example, the optical immersion probe 104 may be, or include, a flow cell that receives a flowing sample into the flow cell and allows the flowing sample to egress from the flow cell. This type of probe 104 allows for optical spectroscopy of the sample to be performed by directing a flowing sample through the probe 104 itself, in contrast to bringing the probe 104 to the sample.

The components of the assembly 100 can be made of any material suitable to an expected sample environment. For example, the probe 104—which is the component part of the assembly 100 that is associated with (e.g., brought near, brought into contact with, etc.) a sample, and thereby exposed to the sample environment—can be made of a metal or a metal alloy, such as Hastelloy®, or the non-metal materials, such as plastic, ceramic, ceramic composites, glass, etc. The probe 104 can be rigid or semi-rigid. Moreover, materials can be machined, sintered, cast, injection molded, 3D-printed, etc., for example to form the probe 104 and the fiber head 102 (and subcomponents and/or features thereof). Additionally, spherical optics (e.g., the optical element 110) can be manufactured from any suitable material, including, without limitation, sapphire, fused silica, glass, doped glass, etc., depending on the optical properties suited to a given scenario.

As shown in FIG. 1, the probe 104 has a distal end 112 where the optical element 110 is located, and a proximal end 114 where a projection 116 is located. The projection 116 at the proximal end 114 of the probe 104 may be in the form of a knob or a bump that protrudes from an outer surface of the probe 104. The projection 116 can be any suitable shape, such as cylindrical, circular, rectangular, or the like, and will be illustrated in more detail in the following figures.

The proximal end 114 of the probe 104 may be tapered. In other words, the outer diameter of the probe 104 may have a sloped surface at the proximal end 114 that transitions—in a direction from the distal end 112 toward the proximal end 114—from a first outer diameter to a second outer diameter that is smaller than the first outer diameter. In this sense, the probe 104 may include a tapered portion with a variable outer diameter that gradually narrows in a direction towards the most proximal point at the proximal end 114 of the probe 104.

The probe 104 is also shown in FIG. 1 as having a collar 118, which is movable along a length of the probe 104 and configured to couple to the optical fiber head 102 at a distal end 120 of the optical fiber head 102. The collar 118 may be coupled to the distal end 120 of the optical fiber head 102 via a threaded engagement between internal threads of the collar 118 and external threads on an outer surface of the optical fiber head 102, which are located at the distal end 120 of the optical fiber head 102. The collar 118 can be made of any suitable material, such as a material that is the same as, or similar to, the material of the probe's 104 body. This includes, without limitation, a metal or a metal alloy, such as Hastelloy, or other materials described herein or generally known to a person having ordinary skill in the art. The optical fiber head 102 also has a proximal end 122 where the optical fiber cable 106 is attached to the optical fiber head 102.

Figure 2:
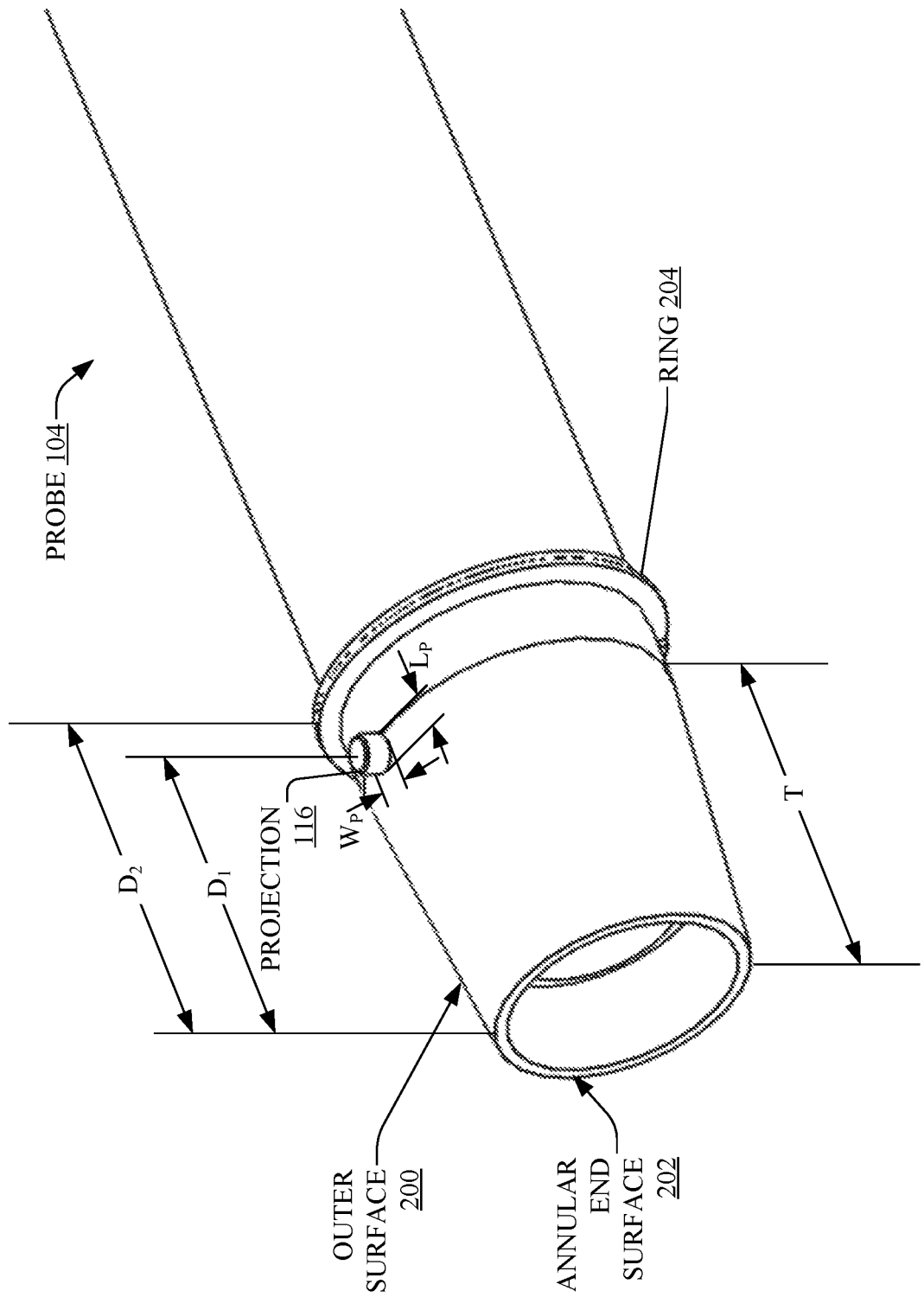
FIG. 2 illustrates a close-up perspective view of a portion of an optical immersion probe, showing a projection on a periphery of the optical immersion probe.

FIG. 2 illustrates a close-up perspective view of a portion of an optical immersion probe 104; namely, the proximal end 114 of the probe 104, as shown in FIG. 1. FIG. 2 shows the projection 116 on the periphery of the optical immersion probe 104 in more detail. The projection 116 may be a protrusion having any suitable shape (e.g., cylindrical, square, rectangular, hemispherical, etc.) that extends from an outer surface 200 of the probe 104. The projection 116 can be manufactured in any suitable manner, such as by welding, braising, 3D printing, or forming the projection 116 using any other suitable additive manufacturing process. Alternatively, the projection 116 can be formed using an injection molding or an extrusion process, or the projection can be machined or formed using a suitable subtractive manufacturing process where material is removed in order to form the projection 116. In some embodiments, the projection 116 is a metal "bead" that is welded onto the probe's 104 body on the periphery of the probe 104.

The projection 116 can be positioned on the outer surface 200 of the probe 104 at a distance, $D_1$, from an annular end surface 202 of the probe 104. The annular end surface 202 is located at the proximal end 114 of the probe 104 and is contiguous with the outer surface 200. This distance, $D_1$, at which the projection 116 is positioned (or spaced) from the annular end surface 202 of the probe 104 can be chosen so as to position the projection 116 at a location where a tapered portion of the probe 104 transitions to a straight portion of the probe 104. In other words, a tapered portion of the probe 104 at the proximal end 114 of the probe 104 may have a length, T, and the projection 116 can be positioned at the transition from the tapered portion of the probe 104 to the straight portion of the probe 104. In this scenario, the length, T, may be substantially equal to the distance, $D_1$. However, the projection 116 may be positioned anywhere near (e.g., within a threshold distance from) the transition between the tapered and straight portions of the probe 104. The length, T, of the tapered end of the probe 104 may be of a dimension that ensures the probe 104 is concentric with the optical fiber head 102 when the probe 104 is coupled to the optical fiber head 102. For example, the tapered end of the probe 104 may have a length that is at least ¾ of a length of a tapered bore defined within the optical fiber head 102 (See FIG. 6).

The projection 116 can be sized (and shaped) to be received within a notch of the optical fiber head 102. Generally, the projection 116 has a width, $W_p$, and a length, $L_p$. In the case of a circular or cylindrical projection 116, the width, $W_p$, of the projection 116 may be equal to a length, $L_p$, of the projection 116 (i.e., corresponding to the diameter of the projection 116). However, the width, $W_p$, may differ from (e.g., be greater than or less than) the length, $L_p$, such as when the projection 116 has an asymmetric profile (e.g., a rectangular projection 116).

FIG. 2 also illustrates a ring 204 that rests in a circumferential groove defined in an outer surface 200 of the probe 104. The ring 204 may extend beyond the outer surface 200 of the probe 104 so that the ring 204 engages with the collar 118 when the collar 118 is coupled to the optical fiber head 102. The ring 204, being disposed within a groove, provides a force that is directed along a center axis of the probe 104 towards the proximal end 114 of the probe 104 when the collar 118 is tightened during a coupling process. This ensures that the proximal end 114 of the probe 104 is fully seated within a bore of the optical fiber head 102, as will be described in more detail below. The ring 204 (and, hence, the circumferential groove in which the ring 204 is disposed) may be positioned at a second distance, $D_2$, from the annular end surface 202 of the probe 104. This second distance, $D_2$, may be greater than the first distance, $D_1$, at which the projection 116 is positioned from the annular end surface 202. In other words, the projection 116 may be positioned between the annular end surface 202 and the ring 204.

Figure 3:
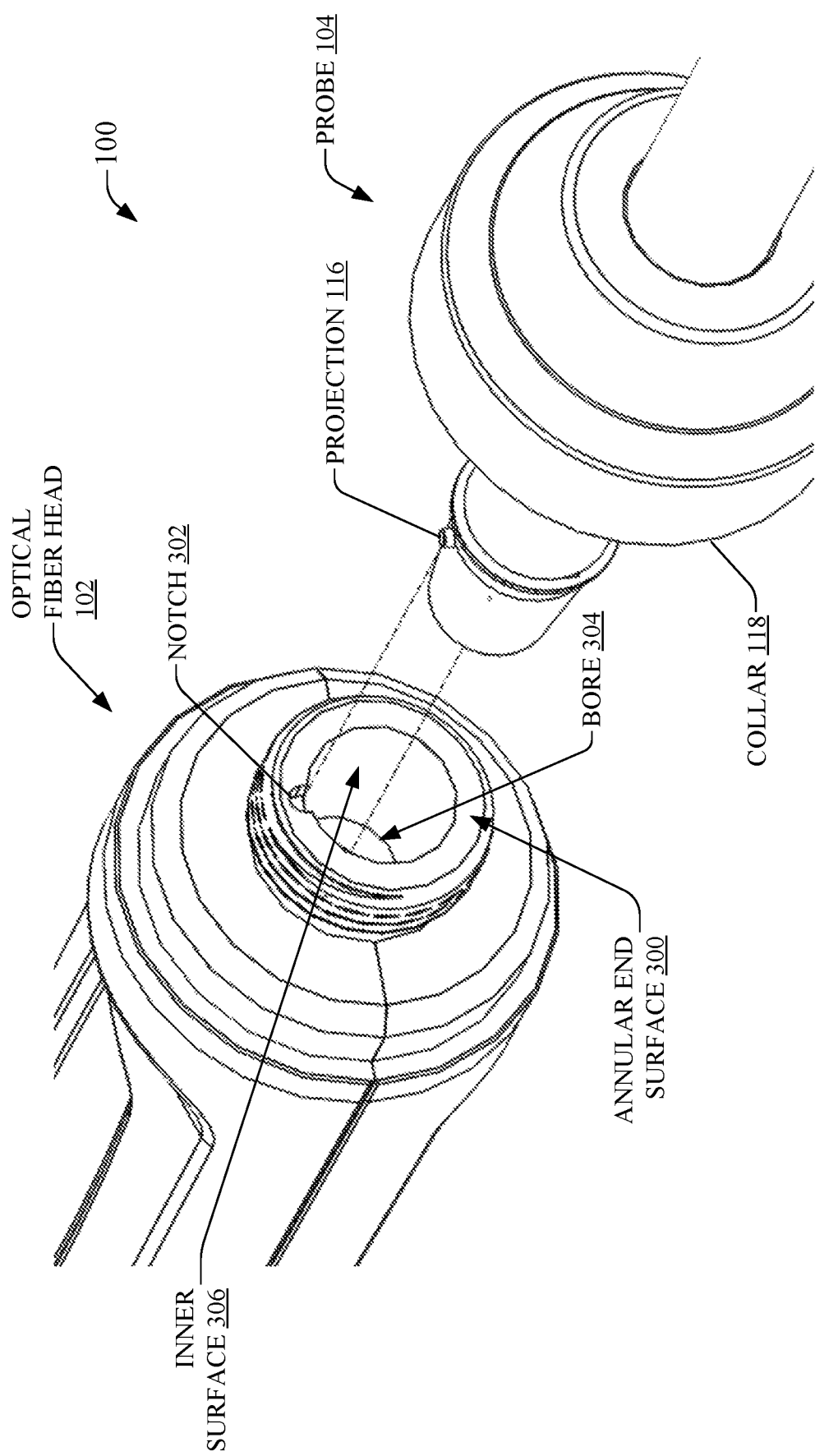
FIG. 3 illustrates a close-up perspective view of an optical immersion probe that is rotationally-aligned with an optical fiber head during assembly of an optical immersion probe assembly.

FIG. 3 illustrates a close-up perspective view of an optical immersion probe 104 that is rotationally-aligned with an optical fiber head 102 during assembly of an optical immersion probe assembly 100. As shown in FIG. 3, the optical fiber head 102 may have an annular end surface 300 at a distal end 120 of the optical fiber head 102, as well as a notch 302 defined in a portion of the annular end surface 300. The notch 302 may be sized (and shaped) to receive the projection 116 of the probe 104, and, likewise, the projection 116 may be sized (and shaped) to be received within the notch 302 of the optical fiber head 102. The notch 302 can be any type of recess, cavity, or slot that is configured to receive a corresponding projection 116 there through. FIG. 3 depicts a notch 302 in the shape of a generally hemispherical cavity, which may be the result of drilling into the annular end surface 300 with a circular drill bit, but the notch 302 can have any other suitable shape.

As shown in FIG. 3, a bore 304 can be defined in a center of the optical fiber head 102 at the distal end 120 of the optical fiber head 102. The bore 304 may be configured to receive the proximal end 114 of the probe 104, when the proximal end 114 of the probe 104 is inserted into the bore 304. In configurations where the proximal end 114 of the probe 104 is tapered, the bore 304 may also be tapered with a commensurate slope relative to the taper of the proximal end 114 of the probe 104. In other words, the inner diameter of the bore 304 may have a sloped surface that transitions—in a direction from the distal end 120 toward the proximal end 122—from a first inner diameter to a second inner diameter that is smaller than the first inner diameter. In this sense, the bore 304 may have a variable inner diameter that gradually narrows in a direction towards the proximal end 122 of the optical fiber head 102.

Accordingly, the optical fiber head 102 may have an inner surface 306 surrounding the bore 304. This inner surface 306 may be contiguous with the annular end surface 300. Moreover, as shown in FIG. 3, the notch 302 may be defined in a portion of the inner surface 306 to prove clearance for inserting the probe 104 having the projection 116 into the bore 304 of the optical fiber head 102.

As shown in FIG. 3, a user can start to assemble the optical immersion probe assembly 100 by positioning the proximal end 114 of the probe 104 adjacent to the distal end 120 of the optical fiber head 102, concentrically aligning the probe 104 and the optical fiber head 102, and rotating the probe 104 until the projection 116 on the periphery of the probe 104 is aligned with the notch 302.

Figure 4:
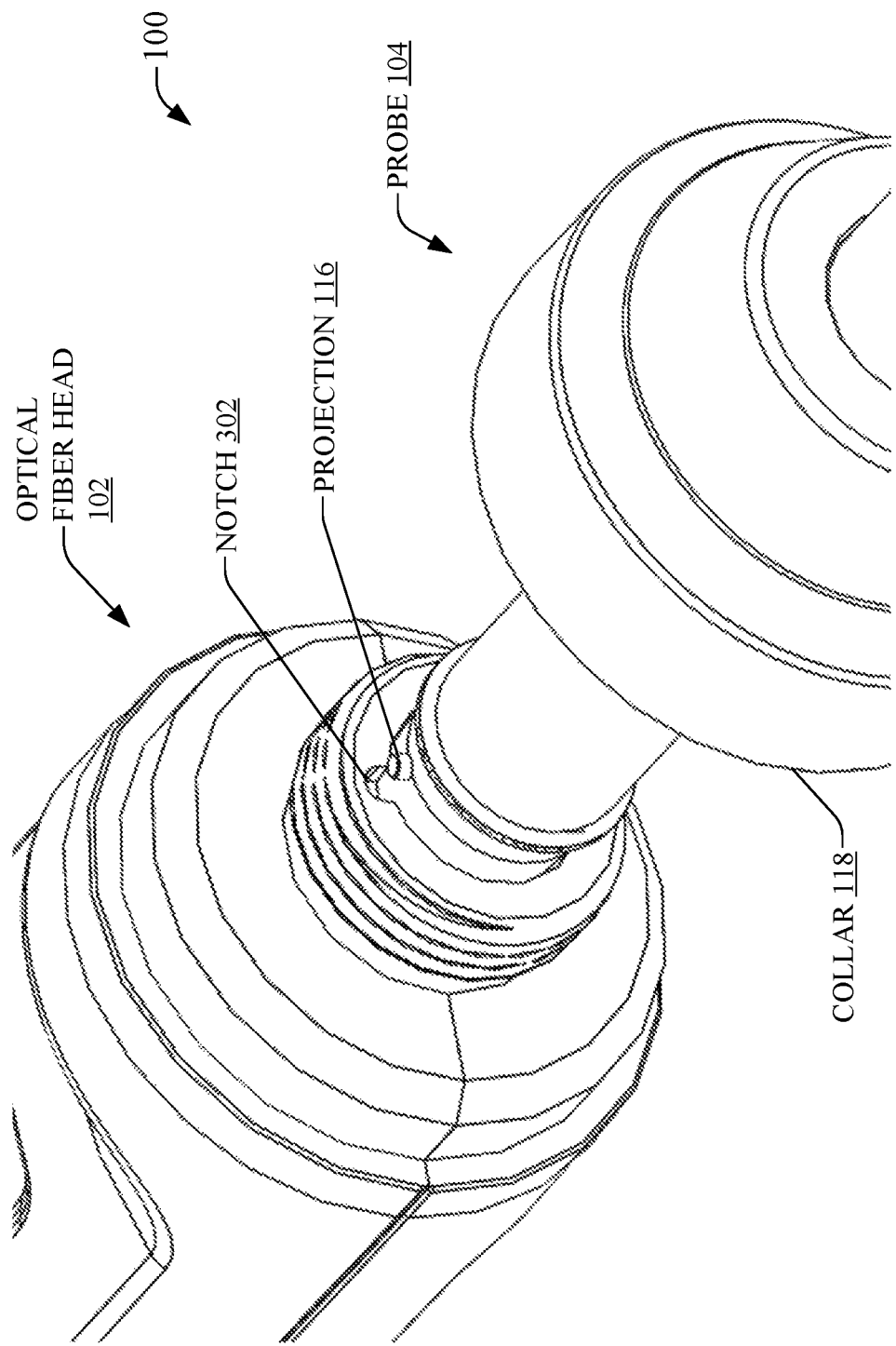
FIG. 4 illustrates a close-up perspective view of an optical immersion probe being inserted into a bore defined in an optical fiber head during assembly of an optical immersion probe assembly.

As shown in FIG. 4, the user can then insert the proximal end 114 of the probe 104 into the bore 304 (See FIG. 3) defined in the optical fiber head 102. The user can continue inserting the proximal end 114 of the probe 104 further into the bore 304 at least until the projection 116 of the probe 104 is received within the notch 302 of the optical fiber head 102.

Figure 5:
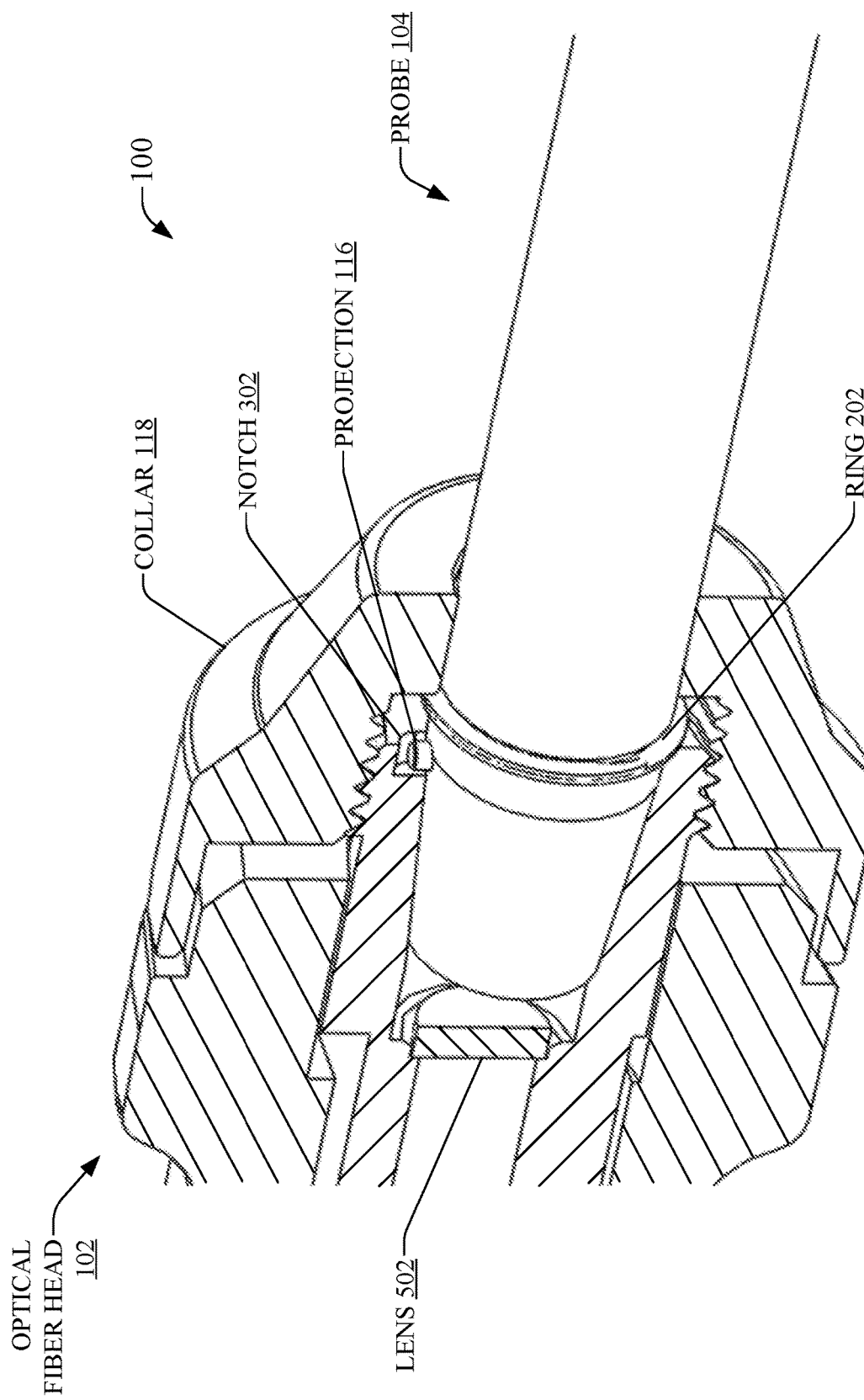
FIG. 5 illustrates a partial cross-sectional perspective view of an example optical immersion probe assembly, taken along Section Lines A-A and B-B shown in FIG. 1, with the components of the assembly shown in an assembled state.

FIG. 5 illustrates a partial cross-sectional perspective view of a fully assembled state where the projection 116 of the probe 104 is received within the notch 302 of the optical fiber head 102. Notably, the cross-sectional view in FIG. 5 is taken along Section Lines A-A and B-B shown in FIG. 1, wherein the probe's 104 body is not shown in cross-section, while the collar 118 of the probe 104 is shown in cross-section.

As shown in FIG. 5, the proximal end 114 of the probe 104 is fully inserted into the bore 304 (see FIG. 3) defined in the optical fiber head 102. In this fully inserted state, the outer surface 200 of the probe 104 at the proximal end 114 of the probe 104 is against (or abutting) the inner surface 306 of the optical fiber head 102 that surrounds the bore 304 at the distal end 120 of the optical fiber head 102. The projection 116 of the probe 104 is also disposed within the notch 302. As shown in FIG. 5, to complete the assembly process, a user can slide (or otherwise move) the collar 118 having internal threads along a length of the probe 104 towards the optical fiber head 102, and may couple the collar 118 to the optical fiber head 102 by engaging the internal threads of the collar 118 with the external threads on the optical fiber head 102 at the distal end 120 of the optical fiber head 102 (e.g., by screwing the collar 118 onto the optical fiber head 102). In this configuration, the ring 204 engages the collar 118 (or the collar 118 engages the ring 204) to provide a force on the probe 104 along the center axis of the probe 104 to drive the probe 104 into the optical fiber head 102. In other words, a clamping force can be applied via the engagement between the ring 204 and the collar 118 to secure the probe 104 within the optical fiber head 102.

FIG. 5 also illustrates a lens 502, such as a collimating lens 502, which may be part of the optical fiber head 102. The lens 502 may be configured to direct light to/from the probe 104, such as by directing an excitation light beam to the optical element 110 through the probe 104.

Figure 6:
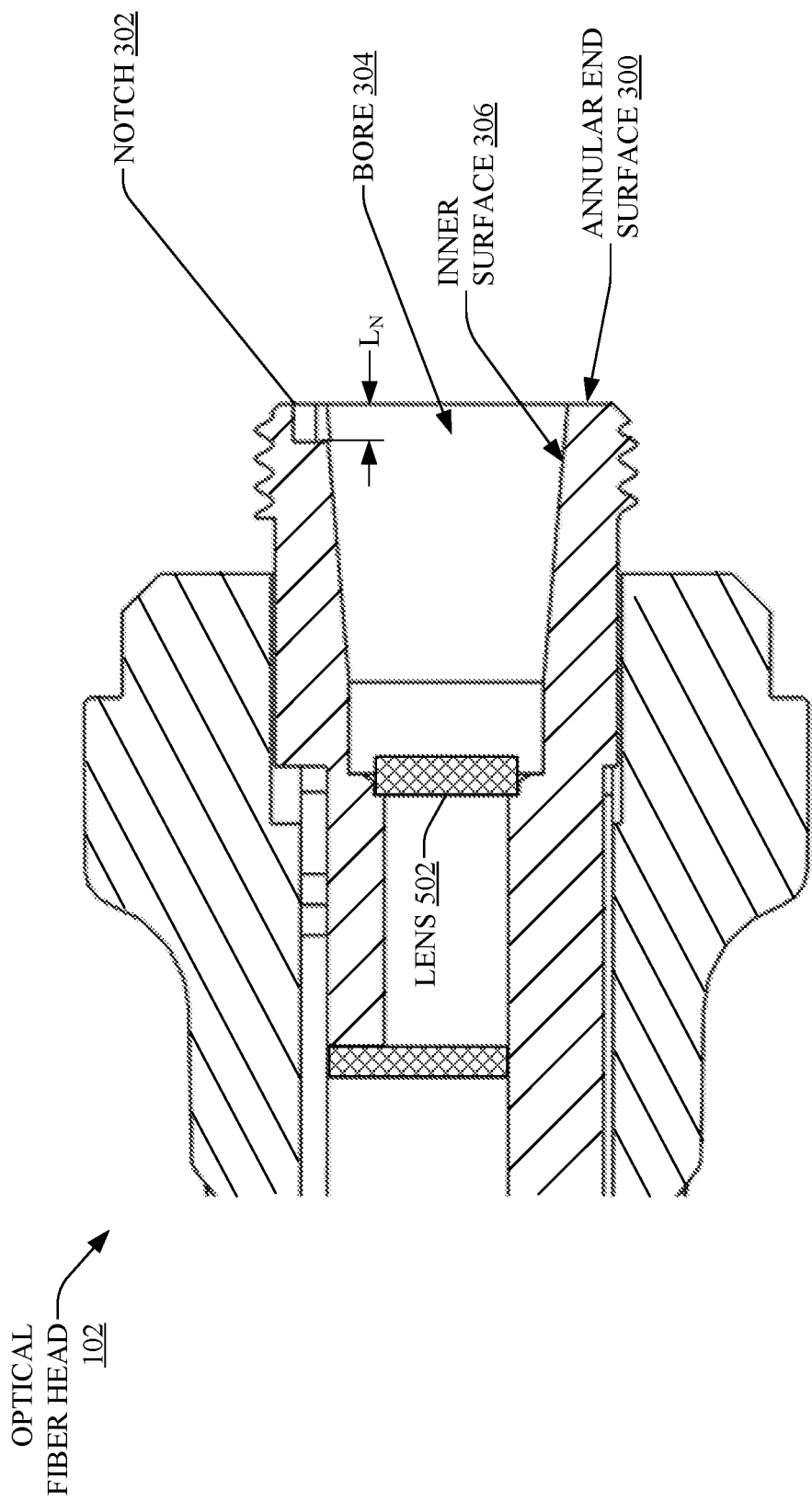
FIG. 6 illustrates a cross-sectional side view of a portion of an example optical fiber head taken along Section Line A-A shown in FIG. 1.

FIG. 6 illustrates a cross-sectional side view of a portion of an example optical fiber head 102 taken along Section Line A-A shown in FIG. 1. In particular, the notch 302 is shown as having a length, $L_N$. In some embodiments, the length, $L_N$, of the notch 302 may be at least about half of the length, $L_p$, of the projection 116 of the probe 104. This length ratio may ensure that there is enough interference between the projection 116 and the walls of the notch 302 to avoid the projection 116 slipping out of the notch if and when the probe 104 is rotated after assembly. In some embodiments, the length, $L_N$, of the notch 302 is equal to or greater than the length, $L_p$, of the projection 116 of the probe 104.

Figure 7:
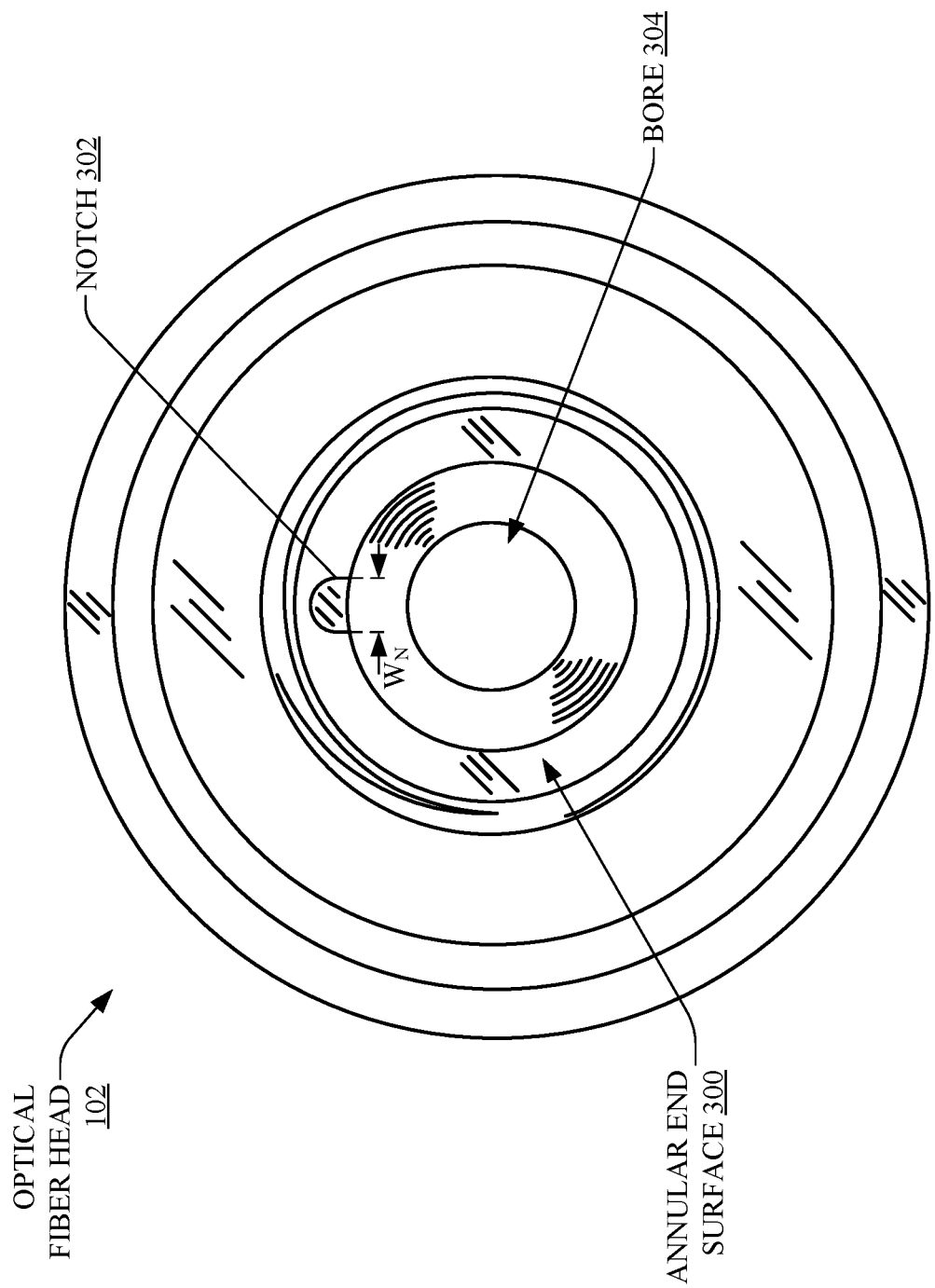
FIG. 7 illustrates a front elevation view of an example optical fiber head, showing a notch defined in a portion of an annular end surface of the optical fiber head.

FIG. 7 illustrates a front elevation view of an example optical fiber head 102, showing the notch 302 defined in a portion of the annular end surface 300 of the optical fiber head 102. In particular, the notch 302 is shown as having a width, $W_N$. The width, $W_p$, of the projection 116 of the probe 104 may be less than the width, $W_N$, of the notch 302 in order to provide clearance for the projection 116 to be received within the notch 302. However, a difference between the width, $W_p$, of the projection 116 and the width, $W_N$, of the notch 302 may be dimensioned to enable a relatively tight fit that prevents rotational play between the probe 104 and the optical fiber head 102. Minimizing this difference in width may inhibit rotation of the probe 104 when the probe 104 is coupled to the optical fiber head 102, which ensures that the component parts of the assembly 100 stay properly aligned.

Figure 8:
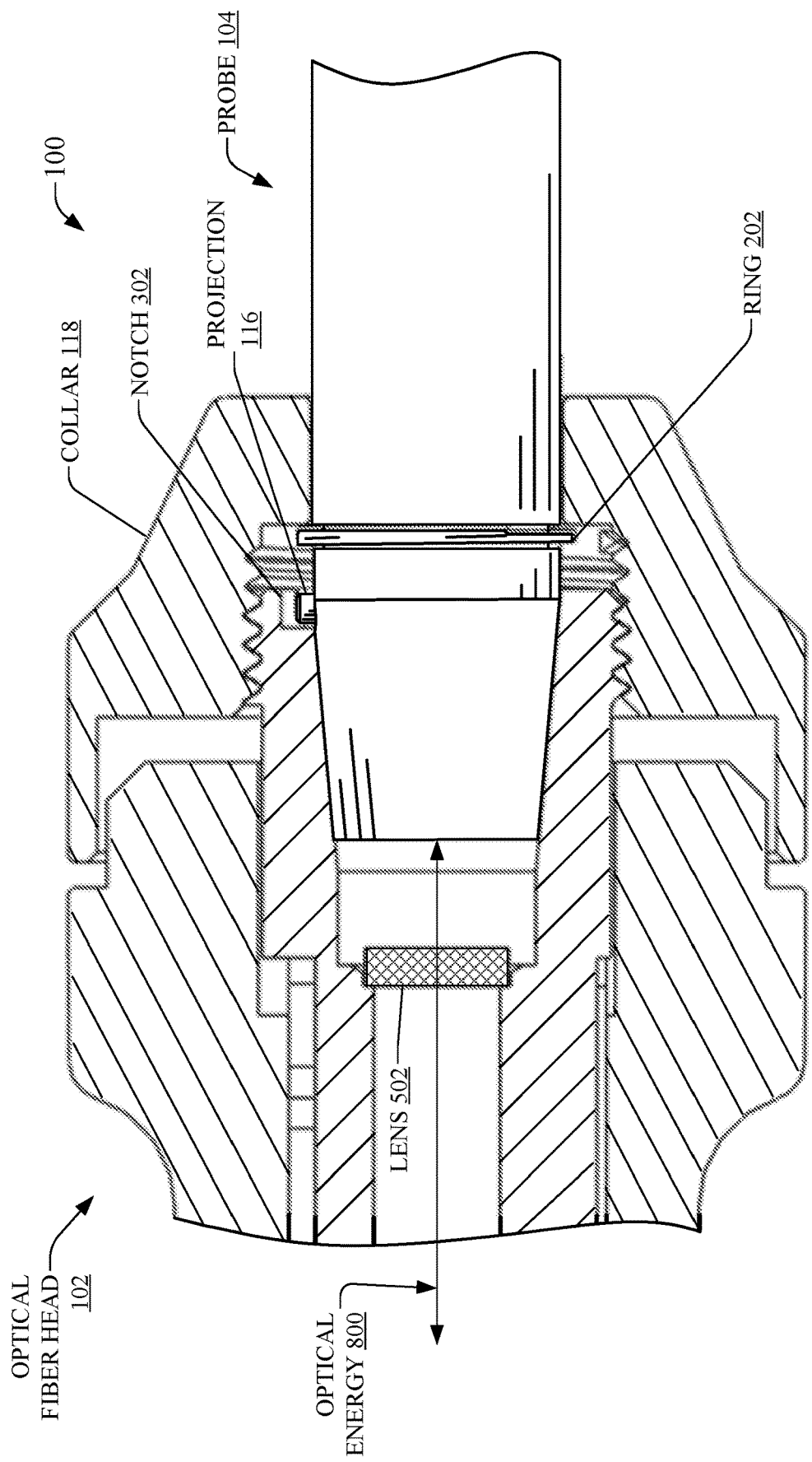
FIG. 8 illustrates a partial cross-sectional side view of a portion of an example optical immersion probe assembly, with the components of the assembly shown in an assembled state, the cross-sectional side view taken along Section Lines A-A and B-B shown in FIG. 1.

FIG. 8 illustrates a partial cross-sectional side view of a portion of an example optical immersion probe assembly 100, with the components of the assembly 100 shown in an assembled state. The cross-sectional side view of FIG. 8 is taken along Section Lines A-A and B-B shown in FIG. 1, wherein the probe 104 is not shown in cross-section, but the collar 118 is shown in cross-section. In this fully assembled state, the probe 104 is concentrically aligned with the bore 304 (see FIG. 3) defined in the optical fiber head 102, and the proximal end 114 of the probe 104 is fully inserted into the bore 304 such that projection 116 of the probe 104 is disposed within the notch 302 defined in the optical fiber head 102. The collar 118 has also been moved along the length of the probe 104 and coupled to the optical fiber head 102 by engaging the internal threads of the collar with the external threads on the optical fiber head 102. This also causes the collar 118 to engage with the ring 204 resting in the circumferential groove defined on the periphery of the probe 104 so that a driving force is provided on the probe 104 along the center axis of the probe 104. When the projection 116 is received within the notch 302, the rotational alignment is optimized and the assembly 100 can function an optical analytical instrument that can be used to perform optical spectroscopy of a sample (e.g., solids, liquids, gases, powders, suspensions, slurries, particles, and/or other homogeneous or heterogeneous samples) using any suitable optical spectroscopy technique, as described herein. Accordingly, optical energy 800 travel through the probe 104, such as an excitation beam of light from an excitation laser source to a sample, or a returned beam of light from the optical element 110 to a spectrometer.

The processes described in this disclosure are illustrated as a collection of blocks in a logical flow graph. The order in which the operations are described is not intended to be construed as a limitation, and any number of the described blocks can be combined in any order or in parallel to implement the processes.

Figure 9:
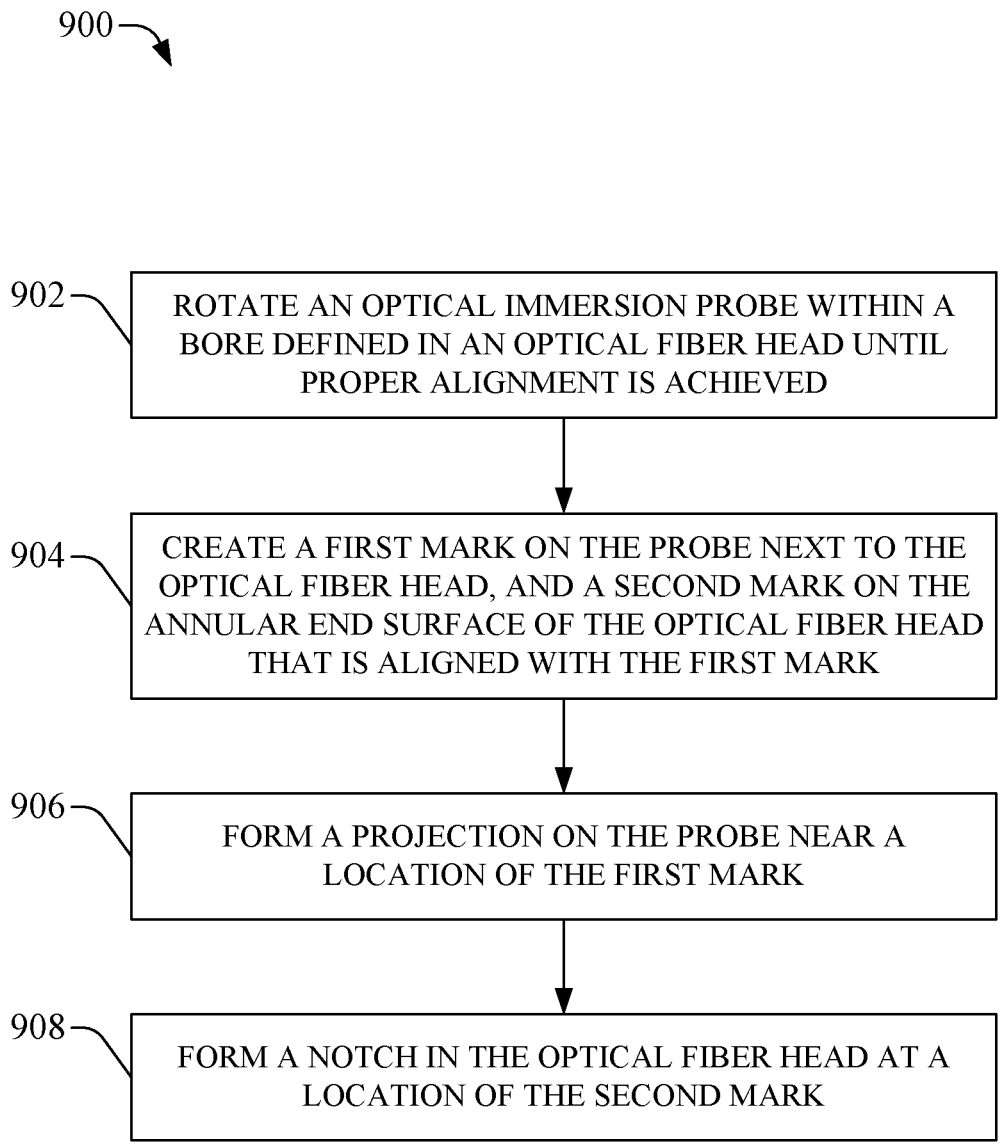
FIG. 9 is a flow diagram of an example process for manufacturing components of an optical immersion probe assembly.

FIG. 9 is a flow diagram of an example process 900 for manufacturing components of an optical immersion probe assembly 100. For discussion purposes, the process 900 is described with reference to the previous figures.

At 902, a manufacturer may obtain an optical immersion probe 104 before a projection has been formed on the probe 104, insert the proximal end 114 of the probe 104 within a bore 304 of an optical fiber head 102, and rotate the probe 104 until proper alignment is achieved. Proper alignment may be achieved when a beam of light from an excitation source travels through the probe 104 and strikes an optical element 110 at the end of the probe 104 without striking the inner walls of the probe 104, and/or when a beam of light travels from the optical element 110 through the probe 104 to the optical fiber head 102 without striking the inner walls of the probe 104.

At 904, after proper alignment has been achieved via the rotation at block 902, the manufacturer may create a first mark on the probe 104 (e.g., on the outer surface 200 of the probe 104) next to the annular end surface 300 of the optical fiber head 102, and a second mark on the annular end surface 300 of the optical fiber head 102 such that the second mark is aligned with the first mark. The marking can be done with a pen, marker, paint, or any suitable marking material, or by etching or removing surface material at the locations where the marks are made. It is to be appreciated that the marking can be done in any order, such as by marking the optical fiber head 102 first, and then marking the probe 104, or vice versa.

At 906, the manufacturer may form a projection 116 on the probe 104 near a location of the first mark. The location near the first mark where the projection 116 is formed may be a location between the annular end surface 202 of the probe 104 and the first mark so that the projection 116 will be received within the to-be-formed notch 302 of the optical fiber head 102. In other words, the projection 116 may be formed at a distance from the first mark that is closer to the annular end surface 202 of the probe 104. As noted herein, the projection 116 can be welded onto the probe's 104 outer surface, or formed in other ways.

At 908, the manufacturer may form a notch 302 in the optical fiber head 102 at the location of the second mark. This may correspond to a portion of the annular end surface 300 of the optical fiber head 102. The notch can be formed by a subtractive manufacturing process, such as by drilling and/or milling a notch into the annular end surface 300 at an appropriate depth.

Figure 10:
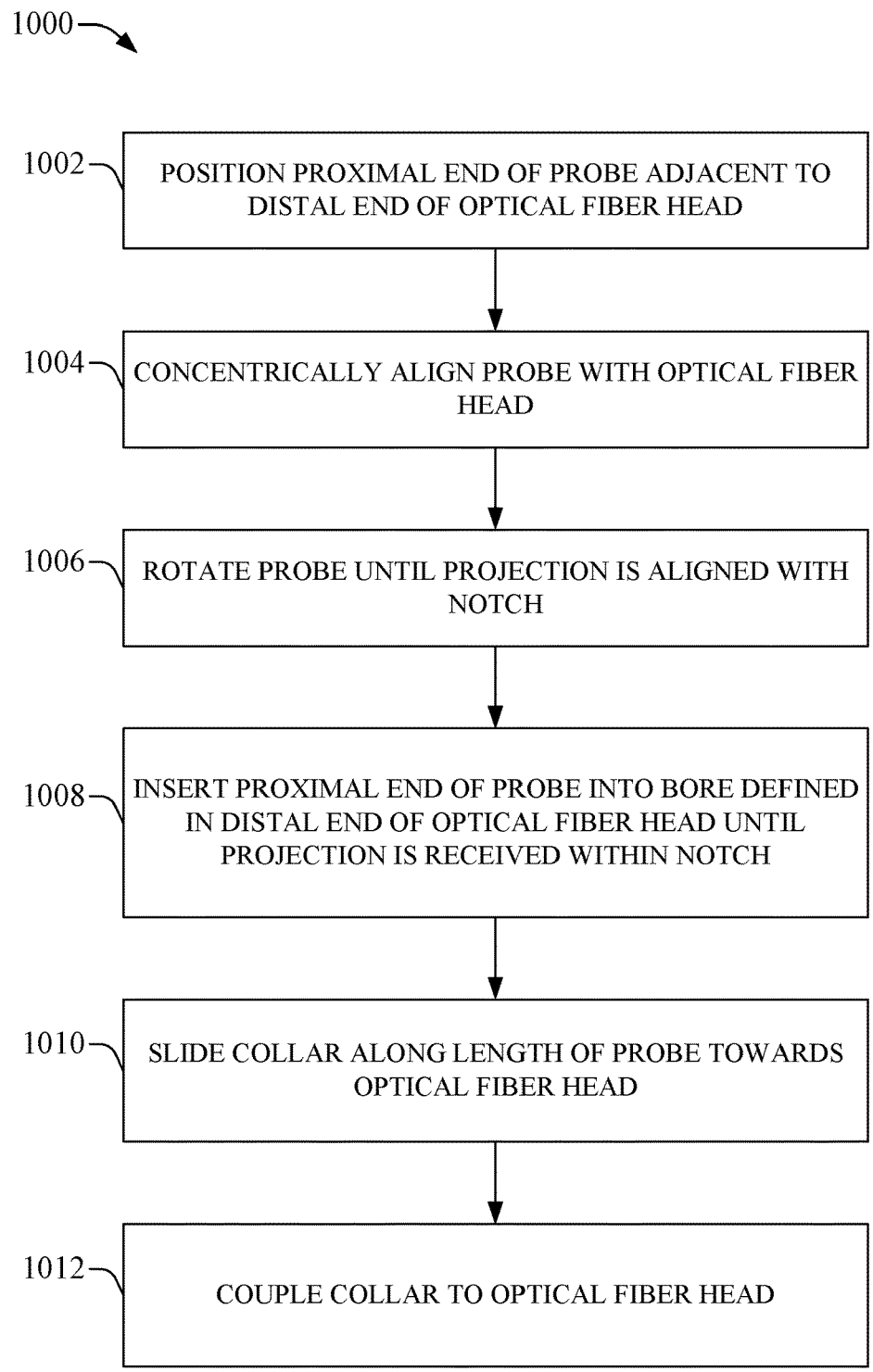
FIG. 10 is a flow diagram of an example process for assembling an optical immersion probe assembly.

FIG. 10 is a flow diagram of an example process 1000 for assembling an optical immersion probe assembly 100. For discussion purposes, the process 1000 is described with reference to the previous figures.

At 1002, a user may position a proximal end 114 of an optical immersion probe 104 adjacent to a distal end 120 of an optical fiber head 102.

At 1004, the user may concentrically align the probe 104 with the optical fiber head 102.

At 1006, the user may rotate the probe 104 until a projection 116 on a periphery of the probe 104 is aligned with a notch 302 defined in a portion of an annular end surface 300 of the optical fiber head 102.

At 1008, the user may insert the proximal end 114 of the probe 104 into a bore 304 defined in the optical fiber head 102 at the distal end 120 of the optical fiber head 102, the inserting performed at least until the projection 116 of the probe 104 is received within the notch 302 of the optical fiber head 102.

At 1010, the user may slide a collar 118 having internal threads along a length of the probe 104 towards the optical fiber head 102.

At 1012, the user may couple the collar 118 to the optical fiber head 102 by engaging the internal threads of the collar 118 with external threads on the optical fiber head 102 at the distal end 120 of the optical fiber head 102.

It is to be appreciated that there may be other ways of ensuring proper alignment between the optical immersion probe 104 and the optical fiber head 102, which are contemplated herein. For example, the projection 116 may be formed as an actuating knob (or detent) that can be depressed while inserting the probe 104 into the bore 304 defined in the optical fiber head 102. In this configuration, a notch 302 may be defined in the inner surface 306 of the optical fiber head 102 at a distance from the annular end surface 300 of the optical fiber head 102. When the probe 104 is fully inserted into the bore 304, the projection 116—being outwardly biased by a spring or a similar mechanism—may be received within the notch 302 upon alignment of the projection 116 and the notch 302.

The environment and individual elements described herein may of course include many other components, of which those shown in the accompanying figures are merely examples that are related to the discussion herein.

The terms "include" or "including" should be interpreted to recite: "comprise, consist of, or consist essentially of." As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless otherwise indicated, all numbers expressing quantities used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the disclosure are approximations, the numerical values set forth in the specific examples are reported as precisely as possible.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

What is claimed is:

1. An optical immersion probe assembly comprising:
    an optical fiber head comprising, at a distal end of the optical fiber head:
        a bore defined in a center of the optical fiber head,
        a notch defined in a portion of an annular end surface of the optical fiber head, and
        external threads on an outer surface of the optical fiber head; and
    an optical immersion probe comprising:
        a projection on an outer surface of the optical immersion probe at a proximal end of the optical immersion probe; and
        a collar having internal threads, the collar being movable along a length of the optical immersion probe,
    wherein the optical immersion probe is configured to couple to the optical fiber head by:
        positioning the proximal end of the optical immersion probe adjacent to the distal end of the optical fiber head;
        concentrically aligning the optical immersion probe and the optical fiber head;
        rotating the optical immersion probe until the projection of the optical immersion probe is aligned with the notch of the optical fiber head;
        inserting the proximal end of the optical immersion probe into the bore of the optical fiber head at least until the projection of the optical immersion probe is received within the notch of the optical fiber head;
        moving the collar along the length of the optical immersion probe towards the optical fiber head; and
        coupling the collar to the optical fiber head by engaging the internal threads of the collar with the external threads of the optical fiber head.

2. The optical immersion probe assembly of claim 1, wherein the optical immersion probe further comprises:
    a circumferential groove defined in the outer surface of the optical immersion probe at a second distance from a second annular end surface at the proximal end of the optical immersion probe, the second distance greater than a first distance at which the projection is positioned from the second annular end surface; and
    a ring that rests in the circumferential groove and extends beyond the outer surface of the optical immersion probe, the ring configured to engage with the collar when the collar is coupled to the optical fiber head via engagement of the internal threads with the external threads.

3. The optical immersion probe assembly of claim 1, wherein the notch has a first width defined in the portion of the annular end surface, and wherein the projection has a second width that is less than the first width.

4. The optical immersion probe assembly of claim 1, wherein the bore is tapered, and wherein a tapered portion of the optical immersion probe at the proximal end of the optical immersion probe has a length that is at least ¾ of a length of the bore.

5. The optical immersion probe assembly of claim 1, wherein:
    the notch has a first length measured from the annular end surface;
    the projection has a second length; and
    the first length is at least half of the second length.

6. The optical immersion probe assembly of claim 1, wherein a distance at which the projection is positioned from a second annular end surface at the proximal end of the optical immersion probe is less than or equal to a threshold distance from, a location where a tapered portion of the optical immersion probe transitions to a straight portion of the optical immersion probe.

7. The optical immersion probe assembly of claim 1, wherein the optical fiber head is configured to:
    couple to an excitation laser source and a spectrometer via an optical fiber cable;
    direct an incident beam of light generated by the excitation laser source through the optical immersion probe; and
    direct a returned beam of light to the spectrometer via the optical fiber cable.

8. An apparatus comprising:
    an optical fiber head having, at a distal end of the optical fiber head:
        a notch defined in a portion of an annular end surface of the optical fiber heat
        a bore defined in the optical fiber head; and
        external threads; and
    an optical immersion probe having:
        a projection on a periphery of the optical immersion probe at a proximal end of the optical immersion probe; and
        a collar having internal threads, the collar being slidable along a length of the optical immersion probe;
    wherein the optical immersion probe is configured to couple to the optical fiber head by:

positioning the proximal end of the optical immersion probe adjacent to the distal end of the optical fiber head;

concentrically aligning the optical immersion probe and the optical fiber head:

rotating the optical immersion probe until the projection of the optical immersion probe is aligned with the notch of the optical fiber head;

inserting the proximal end of the optical immersion probe into the bore of the optical fiber head at least until the projection of the optical immersion probe is received within the notch of the optical fiber head;

sliding the collar along the length of the optical immersion probe towards the optical fiber head; and coupling the collar to the optical fiber head by engaging the internal threads of the collar with the external threads of the optical fiber head.

9. The apparatus of claim 8, wherein the optical immersion probe further comprises:

a circumferential groove defined in an outer surface of the optical immersion probe at a second distance from a second annular end surface of the optical immersion probe that is greater than a distance at which the projection is positioned from the second annular end surface; and a ring that rests in the circumferential groove and extends beyond the outer surface of the optical immersion probe, the ring configured to engage with the collar when the collar is coupled to the optical fiber head via engagement of the internal threads with the external threads.

10. The apparatus of claim 8, wherein the notch has a first width defined in the portion of the annular end surface, and wherein the projection has a second width that is less than the first width.

11. The apparatus of claim 8, wherein:

the optical fiber head comprises an inner surface surrounding the bore defined in a center of the optical fiber head, the inner surface contiguous with the annular end surface;

the bore is tapered;

the optical immersion probe is tapered at the proximal end of the optical immersion probe; and the optical immersion probe is sized to be received within the bore of the optical fiber head.

12. The apparatus of claim 11, wherein a tapered portion of the optical immersion probe at the proximal end of the optical immersion probe has a length that is at least ¾ of a length of the bore.

13. The apparatus of claim 11, wherein a distance at which the projection is positioned from a second annular end surface of the optical immersion probe is less than or equal to a threshold distance from, a location where a tapered portion of the optical immersion probe transitions to a straight portion of the optical immersion probe.

14. The apparatus of claim 8, wherein:

the notch has a first length measured from the annular end surface;

the projection has a second length; and the first length is at least half of the second length.

15. The apparatus of claim 8, wherein the optical fiber head is configured to:

couple to an excitation laser source and a spectrometer via an optical fiber cable;

direct an incident beam of light generated by the excitation laser source through the optical immersion probe; and direct a returned beam of light to the spectrometer via the optical fiber cable.

16. A method of assembling an optical immersion probe assembly comprising:

positioning a proximal end of an optical immersion probe adjacent to a distal end of an optical fiber head;

concentrically aligning the optical immersion probe and the optical fiber head;

rotating the optical immersion probe until a projection on a periphery of the optical immersion probe is aligned with a notch defined in a portion of an annular end surface of the optical fiber head;

inserting the proximal end of the optical immersion probe into a bore defined in the optical fiber head at the distal end of the optical fiber head, the inserting performed at least until the projection of the optical immersion probe is received within the notch of the optical fiber head;

sliding a collar having internal threads along a length of the optical immersion probe towards the optical fiber head; and coupling the collar to the optical fiber head by engaging the internal threads of the collar with external threads on the optical fiber head at the distal end of the optical fiber head.

17. The method of claim 16, wherein the projection positioned a distance from a second annular end surface of the optical immersion probe.

18. The method of claim 16, wherein the bore of the optical fiber head is tapered, and wherein the proximal end of the optical immersion probe is tapered to slidingly mate with the bore during the inserting.

* * * * *